(12) United States Patent
Vorbuchner

(10) Patent No.: US 6,283,837 B1
(45) Date of Patent: Sep. 4, 2001

(54) GRINDING MACHINE

(75) Inventor: Robert Vorbuchner, Burghausen (DE)

(73) Assignee: Wacker Siltronic Gesellschaft für Halbleitermaterialien AG, Burghausen (DE)

( * ) Notice: Subject to any disclaimer, the term of this patent is extended or adjusted under 35 U.S.C. 154(b) by 0 days.

(21) Appl. No.: 09/335,665

(22) Filed: Jun. 18, 1999

(30) Foreign Application Priority Data

Aug. 20, 1998 (DE) ............................................... 198 37 858

(51) Int. Cl.[7] ........................................................ B24B 1/00
(52) U.S. Cl. .................................. 451/58; 451/49; 451/66
(58) Field of Search .............................. 451/49, 57–58, 451/5, 242, 65, 66, 41, 362

(56) References Cited

U.S. PATENT DOCUMENTS

| 4,331,452 | * | 5/1982 | Causey et al. ........................... 451/49 |
| 4,951,422 | * | 8/1990 | Ibe et al. .................................... 451/5 |
| 5,007,204 | * | 4/1991 | Ibe et al. ................................... 451/49 |
| 5,027,562 |   | 7/1991 | Kobayashi et al. . |
| 5,201,145 | * | 4/1993 | Ibe ............................................. 451/5 |
| 5,525,092 | * | 6/1996 | Hirano et al. ............................. 451/5 |
| 5,704,826 | * | 1/1998 | De Luis Vizcaino ................ 451/242 |

FOREIGN PATENT DOCUMENTS

| 4112763 | | 10/1991 | (DE) . |
| 19532222 | | 3/1997 | (DE) . |
| 4043229652 | * | 11/1992 | (JP) ......................................... 451/5 |

OTHER PUBLICATIONS

Brychta Z.: "Komplett in einer Aufspannung Schleifen", Werkstatt und Betrieb, De, Carl Hanser Verlag, München, vol. 132, No. 5, (May 1999) pp. 101–103.

Derwent Abstract (#1991–326775 [45]) Corresponding to DE 41 12 763.

Derwent Abstract (#1997–155675 [15]) Corresponding to DE 195 32 222.

* cited by examiner

*Primary Examiner*—Joseph J. Hail, III
*Assistant Examiner*—George Nguyen
(74) *Attorney, Agent, or Firm*—Collard & Roe, P.C.

(57) ABSTRACT

A grinding machine has a swivel head (1) with at least one plunge-grinding wheel (2), a cup wheel (3) and a measuring gauge (7) for measuring the diameter and the length of the workpiece.

4 Claims, 1 Drawing Sheet

GRINDING MACHINE

BACKGROUND OF THE INVENTION

1. Field of the Invention

The present invention relates to a grinding machine and to a method for grinding semiconductor bars.

2. The Prior Art

Monocrystalline semiconductor bars which have been produced using the Czachralski crucible drawing method have an irregular surface and a fluctuating length. The irregular surface means that the diameter fluctuates along the semiconductor bar and decreases in some places and increases again at other places. This may even lead to a "corkscrew" shape. The result is that the bar has to be ground down to the specified desired diameter, so that the bar has a uniform diameter before it is cut into wafers.

Usually, the semiconductor bars are ground using a plunge-grinding wheel or cup wheel. The plunge-grinding wheel is a grinding wheel in which the width of the circumferential surface of the wheel is used for grinding. A cup wheel is a grinding wheel which is a straight or conical, circular grinding body with, on one side, a deep cutout and hole, in which the thickness of the base or of the web is less than ⅓ of the total width. That is, when its attachment means is facing downward, its top edge forms the grinding element.

For conventional rough and precision grinding using a plunge-grinding wheel, this wheel is considerably deprofiled on the left-hand edge or right-hand edge during the finishing precision grinding or oscillation grinding. This deprofiling considerably reduces the effective width of the abrasive coating. This takes place because the semiconductor bar is moved past the plunge-grinding wheel with a lateral feed. This means that the plunge-grinding wheel is subject to considerable abrasion in particular at its flanks. The drawback of this is that the plunge-grinding attachment has to be corrected relatively often. Thus the plunge-grinding wheel has to be reground and resurfaced frequently in order for the full grinding width to be available again. This has the result that valuable diamond coating is lost without producing any benefit. This leads to higher grinding material costs. A further drawback which results from the regrinding and resurfacing is an increased cost factor, since during this period the machine and the staff are not available for production.

Furthermore, grinding machines of this nature are not tolerant of flaws. This means that before grinding it is always necessary to input the appropriate diameter. Input errors may occur, resulting in too much material being ground off the semiconductor bar, making this bar unusable. Furthermore, incorrect input of this nature may cause the wheel to be advanced too far, thus moving into the semiconductor bar and damaging the bar and, under certain circumstances, damaging the grinding machine as well.

When grinding using the cup wheel, the semiconductor bar, which is guided past the rotating cup wheel with a lateral feed, is ground carefully. A drawback of this method compared to grinding using the plunge-grinding wheel is that this form of grinding requires approximately twice as much time to grind a bar as does grinding using the plunge-grinding wheel.

SUMMARY OF THE INVENTION

It is an object of the present invention to overcome the drawbacks of the prior art and, in particular, to provide a machine and a method by which semiconductor bars can be ground quickly and without causing damage to these bars or to the machine.

This object is achieved by means of the present invention, which relates to a grinding machine which has a swivel head with at least one plunge-grinding wheel, a cup wheel and a measuring gauge for measuring the diameter and the length of the workpiece.

The present invention also relates to a method for grinding a semiconductor bar, comprising grinding a semiconductor bar in a single operation by plunge grinding and by cup grinding, and in which the semiconductor bar has a length and a diameter.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the single view.

DETAILED DESCRIPTION OF PREFERRED EMBODIMENTS

Figure 1:
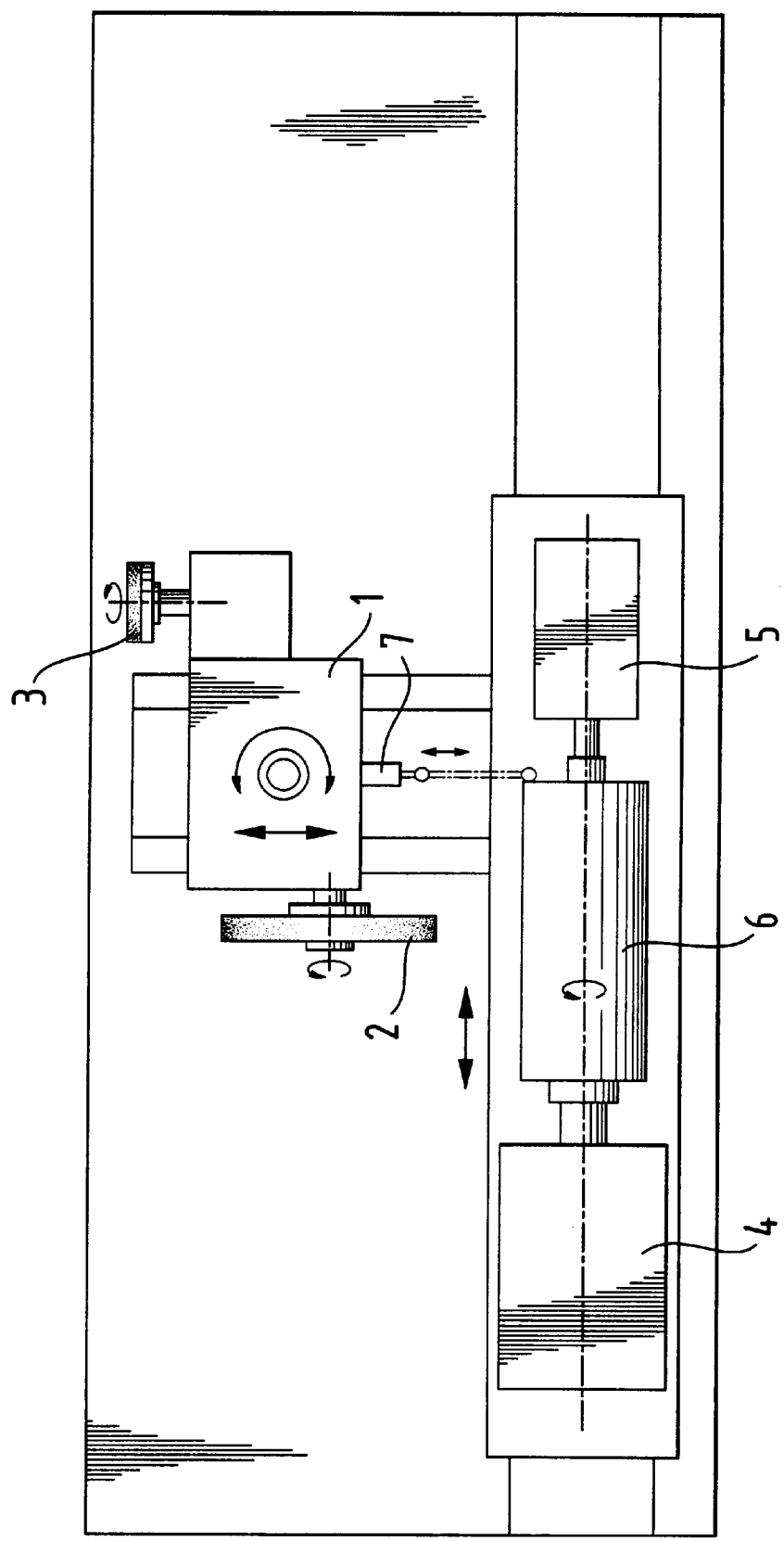
FIG. 1 represents a diagrammatic illustration of the grinding machine according to the invention.

Turning now in detail to the drawings, FIG. 1 shows a grinding machine for semiconductor bars having a swivel head (1) on which a plunge-grinding wheel (2) and a cup wheel (3) are arranged. By pivoting the swivel head (1) (through 180°), it is possible for either the plunge-grinding wheel (2) or the cup wheel (3) to grind the semiconductor bar (6) which has been clamped between workpiece drive (4) and tailstock (5). Both grinding wheels, i.e. the plunge-grinding wheel (2) and the cup wheel (3), are provided with an abrasive diamond coating. Furthermore, the grinding machine has a measuring gauge (7), which is preferably mounted on the grinding-wheel spindle headstock. This measuring gauge (7) is extended in order to measure the length of the bar (6). A length value which has already been input by the operator into a computer is then compared with the measured length value by the computer.

The present invention also relates to a method for grinding semiconductor bars, in which a semiconductor bar (6) is ground in a single operation by plunge grinding and cup grinding, the cup grinding preferably taking place after the plunge grinding.

In the novel method of the invention for grinding semiconductor bars, a semiconductor bar (6), in particular a monocrystalline semiconductor bar, is attached between the workpiece drive (4) and the tailstock (5). A measuring gauge (7) firstly measures the length of the semiconductor bar (6), in that it moves from one end to the other end of the semiconductor bar. Gauge 7 can also measure the distance to a known point, for example to the workpiece drive (4). This value is compared with the value which the operating staff has already input. If this value differs by a certain tolerance range, for example ±5 mm, the program is interrupted, since otherwise the grinding machine or the semiconductor bar (6) itself may be damaged. The operating staff is instructed as to what to do.

Then, the diameter plus the overmeasure is measured. This overmeasure is a value which is a safety factor making it possible to take into account the irregular shape of the semiconductor bar (6). For this purpose, the rod rotation mechanism is switched on and the entire circumferential surface is checked for any excess diameter. If the measuring gauge (7) encounters an excess diameter while the circumferential surface is moving, a corresponding fault message appears, with the appropriate indication of what measures are to be taken.

It is therefore particularly important to detect the shape of the semiconductor bar (6), since the grinding machine is designed to grind cylindrical workpieces with a small excess diameter of on average ≦1 mm. In order to ensure that the machining time does not become disproportionately long, as small an overmeasure as possible is used, with the result, however, that the risk of breakage increases considerably.

Preferably, the plunge grinding precedes the cup grinding. The semiconductor bar (6) preferably is guided past the plunge-grinding wheel (2) or the cup wheel (3) using a feed mechanism.

The grinding machine according to the invention can also be used to grind flats and grooves, also using a second measurement system if appropriate. These flats and grooves show the crystal orientation to the purchasers of the semiconductor material.

Accordingly, while a few embodiments of the present invention have been shown and described, it is to be understood that many changes and modifications may be made thereunto without departing from the spirit and scope of the invention as defined in the appended claims.

What is claimed is:

1. A method for grinding a semiconductor bar, and said semiconductor bar having a length and a diameter, comprising providing a swivel head (1) having at least one plunge-grinding wheel (2), a cup wheel (3) and a measuring gauge (7) for measuring the diameter and the length of the semiconductor bar;

pivoting the swivel head (1) through 180°, wherein it is possible for either the plunge-grinding wheel (2) or the cup wheel (3) to grind the semiconductor bar (6); and grinding the semiconductor bar (6) by plunge grinding and by cup grinding.

2. The method for grinding a semiconductor bar as claimed in claim 1, comprising measuring the length of the semiconductor bar (6).

3. The method for grinding a semiconductor bar as claimed in claim 1, comprising rotating the semiconductor bar; and measuring the diameter over the length of the rotating semiconductor bar (6).

4. The method for grinding a semiconductor bar as claimed in claim 1 comprising first plunge grinding said bar; and then cup grinding said bar.

* * * * *